(12) United States Patent
Ben-Ari et al.

(10) Patent No.: US 7,726,675 B2
(45) Date of Patent: Jun. 1, 2010

(54) CONVERTED HIGH MOBILITY VEHICLE AND CONVERSION METHOD THEREFOR

(75) Inventors: Yakov Ben-Ari, M.P. Galil Elyon (IL); Tal Dai, Petach-Tikva (IL)

(73) Assignee: Plasan Sasa Ltd., M.P. Marom Hagalil (IL)

( * ) Notice: Subject to any disclaimer, the term of this patent is extended or adjusted under 35 U.S.C. 154(b) by 758 days.

(21) Appl. No.: 11/524,946

(22) Filed: Sep. 22, 2006

(65) Prior Publication Data

US 2010/0059953 A1 Mar. 11, 2010

(30) Foreign Application Priority Data

Sep. 22, 2005 (IL) .................... 171040

(51) Int. Cl.
B62D 53/06 (2006.01)
(52) U.S. Cl. .................................. 280/149.2
(58) Field of Classification Search ............ 280/149.2; 180/905, 906, 908; 301/124.1, 128
See application file for complete search history.

(56) References Cited

U.S. PATENT DOCUMENTS

| | | | |
|---|---|---|---|
| 3,366,411 A | 1/1968 | Vittone | |
| 4,099,313 A | 7/1978 | Phillips | |
| 4,368,793 A * | 1/1983 | Igarashi | 180/14.4 |
| 4,422,685 A * | 12/1983 | Bonfilio et al. | 296/193.04 |
| 4,540,377 A * | 9/1985 | Rehkemper et al. | 446/430 |
| 5,156,230 A | 10/1992 | Washburn | |
| 5,249,823 A * | 10/1993 | McCoy et al. | 280/656 |
| 7,036,848 B2 * | 5/2006 | Chernoff et al. | 280/782 |

FOREIGN PATENT DOCUMENTS

DE 35 34 939 A1 4/1987

\* cited by examiner

*Primary Examiner*—Faye M. Fleming
(74) *Attorney, Agent, or Firm*—The Nath Law Group; Derek Richmond; Jiaxiao Zhang

(57) ABSTRACT

Method is provided for after market conversion of a 4×4 vehicle produced by a manufacturer into a high mobility vehicle having increased maneuverability and on-road and/or off-road capability, relative to the 4×4 vehicle. The 4×4 vehicle has a chassis with a frame, front axle and rear axle, said chassis having a standard wheelbase. The method includes dismounting at least one of the front axle or rear axle from the frame; shortening said frame; and mounting the dismounted axle to the shortened frame so as to obtain a shortened chassis having a shortened wheelbase which is shorter than any standard wheelbase of the line of models produced by the manufacturer.

19 Claims, 6 Drawing Sheets

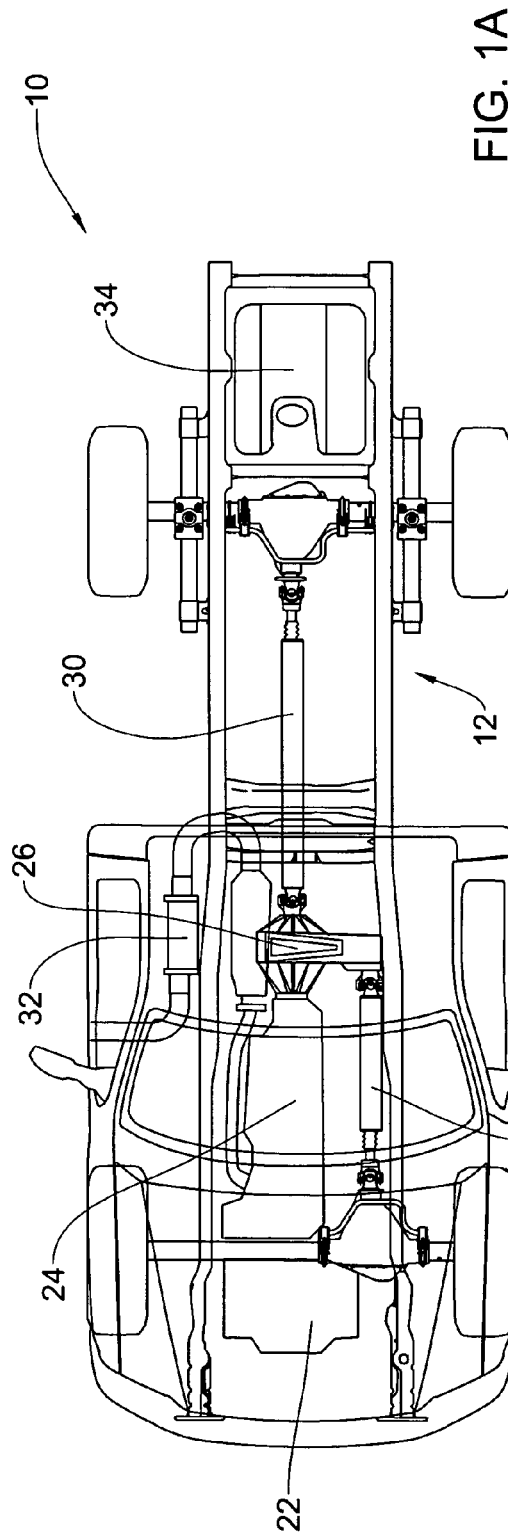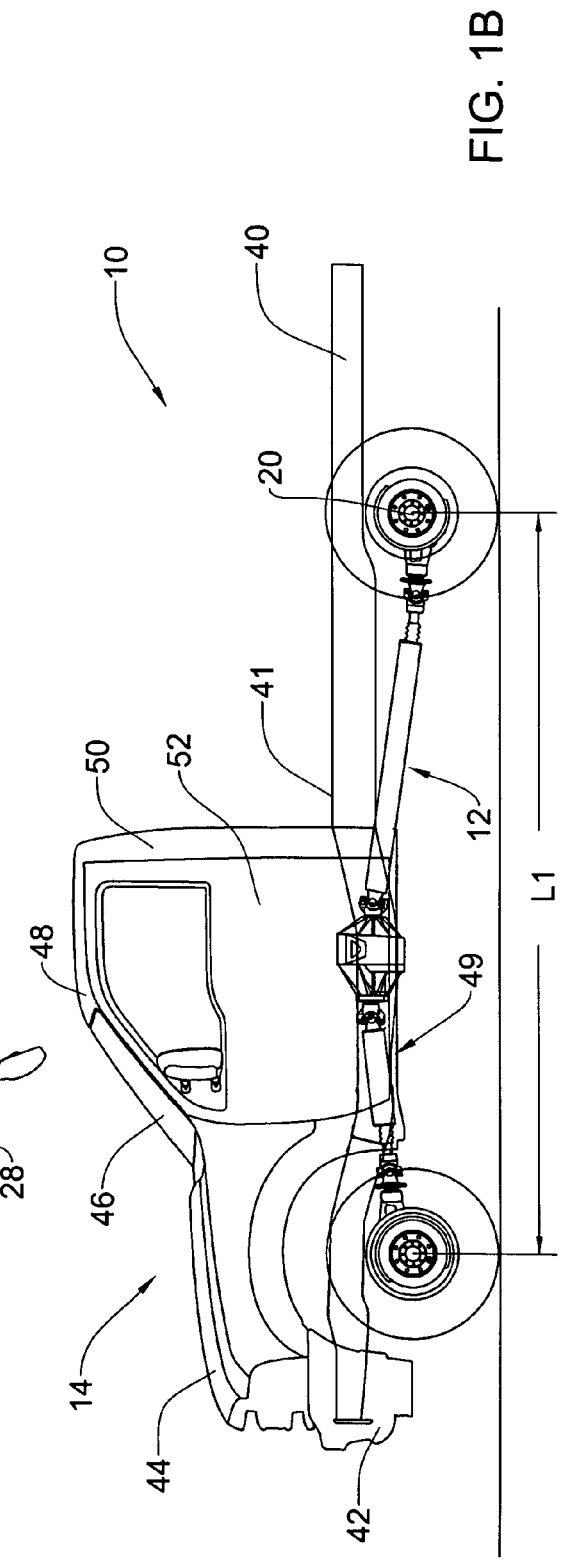

CONVERTED HIGH MOBILITY VEHICLE AND CONVERSION METHOD THEREFOR

FIELD OF THE INVENTION

This invention relates to high mobility, four-wheel drive/two axle vehicles, in particular to a method of manufacturing such vehicle, and an armored variety of such vehicle.

BACKGROUND OF THE INVENTION

An outstanding light vehicle of World War II was the jeep, a small general-purpose motor vehicle with 80-inch wheelbase, ¼-ton capacity, developed by the U.S. Army Quartermaster Corps. It weighed 1.25 tons, had a four-cylinder engine, and could climb 60° grades and operate on rough terrain thanks to its four-wheel drive and high clearance. Since the war the jeep has been adapted for civilian use and appeared in many varieties known today as on-road and/or off-road 4×4 vehicles.

In the U.S. military, it has been replaced by the High Mobility Multipurpose Wheeled Vehicle (HMMWV®), or Humvee®. Armored varieties of the jeep include the G-Wagon, Storm and Humvee®. Civilian varieties of the jeep include the Land Rover®, Land Cruiser®, and Ford Explorer®.

As is often the case with specialized military vehicles, which are generally produced in small batches, the cost of armored jeeps is usually far higher than their mass produced civilian equivalents.

"Armored cars" or civilian vehicles modified to protect the occupants from projectiles and explosives such as those produced for diplomat protection have been commercially available for many years. Such vehicles are designed to protect the occupants whilst appearing to onlookers as unmodified civilian vehicles.

SUMMARY OF THE INVENTION

In the present specification and claims, the following terms will be used:

4×4—a vehicle with two axles and four or more wheels in which any combination of wheels may be driven, for example, a vehicle with four wheels that continuously drives all four wheels, or a vehicle with four wheels that may have an operative mode in which only two wheels are being driven, and, that may be operatively switched to drive all four wheels, or a vehicle with four wheels that continuously drives two wheels;

Standard wheelbase—a wheelbase of a vehicle in mass production, produced for civilian purposes, as advertised in a catalogue or brochure.

Line of models (of a vehicle)—varieties of models of a vehicle having a similar Gross Vehicle Weight (GVW) produced by the same manufacturer under a model brand.

In accordance with one aspect of the present invention, there is provided a method for after market conversion of a 4×4, produced by a manufacturer, having a chassis with a frame, front axle and rear axle, said chassis having a standard wheelbase, into a high mobility vehicle having increased maneuverability and on-road and/or off-road capability, relative to the 4×4, including:

dismounting at least one of the front axle or rear axle from said frame;
shortening said frame; and
mounting the dismounted axle to the shortened frame so as to obtain a shortened chassis having a shortened wheelbase which is shorter than any standard wheelbase of the line of models produced by said manufacturer.

For example, a chassis with standard wheelbase of about 140" may be converted into a chassis with shortened wheelbase of about 112" or less.

The frame shortening may be performed by cutting off the front or rear over hang of the frame and/or by cutting off a middle part of the frame and restoring the frame integrity.

For conversion of a 4×4 with a driver's cabin with two doors and a rear wall, the method may further comprise cutting off the cabin's rear wall, and extending the cabin by mounting of a rear part including floor, side and roof extensions and a rear wall, with optional seats, side doors, rear door, trunk and trunk lid.

For conversion of a 4×4 with a driver's cabin with four doors and a rear wall, the method may further comprise cutting off at least a portion of the cabin's rear wall, and adding a trunk and trunk lid.

The method may further include converting the 4×4 into an armor-protected vehicle, for example, by adding armor. For conversion of a 4×4, without a driver's cabin, the method may include building an armored vehicle body on the shortened chassis. Alternatively, for conversion of a 4×4 with a driver's cabin, the method may include removing the cabin and building an armored vehicle body on the shortened chassis. Alternatively, the method may include a combination of the aforementioned methods.

In particular, for a driver's cabin with two doors and a rear wall, the method may comprise:

removing cabin's fenders, hood, windshield, roof, floor, doors and the rear wall;
mounting armored fenders, armored hood, armored windshield and windshield frame; and
extending the original cabin by mounting of a rear part including a floor extension and rear seats thereon, armored doors, armored roof, floor and armored rear body portion.

According to another aspect of the present invention, there is provided a high mobility vehicle converted from an off-the-shelf 4×4 by any of the methods described above.

The converted vehicle may have a trunk and trunk lid, or a door in the rear part of the cabin. The rear seats, trunk, trunk lid and rear door may be designed so as to allow insertion of a medical stretcher or other equipment into the cabin or emergency exit from the cabin.

The 4×4 for conversion into an armored vehicle may be designed for GVW of 4.5 tons and the armored vehicle may be used for a lower GVW (i.e. 4 tons) to obtain a technical safety factor for the chassis and different components. Such a converted vehicle may include the following:

transparent armor, multilayer glass with thickness of 30-45 mm, for the windows and/or windshield;
steel or a combination of steel and composite materials or a combination of steel and/or aluminum and/or ceramic and/or composite materials in the doors, walls, floor and roof;

A converted armored vehicle may be obtained from an off-the-shelf pick-up such as the Ford F37 designed for a GVW of 5.7 tons, while the armored vehicle may be designed for a GVW of 5 tons. In this case, the floor may be armored and the armored windows may be 60 mm thick or more.

The method in accordance with the present invention, whereby a high mobility vehicle produced from a 4×4 has many advantages including the following:

4×4s in mass production are available in chassis-cab configuration at a relatively low price;

demand for converted vehicles is not expected to justify their mass-production by manufacturers, especially the armored varieties;

the conversion process is relatively simple and may be carried out under the supervision and/or certification of the original manufacturer;

maintenance and spare parts costs are the same as for the original 4×4;

the shortened frame provides also dramatically improved maneuverability.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1A and 1B are respectively a top view and side view of an off-the-shelf pick-up Ford F350;

DETAILED DESCRIPTION OF EXEMPLARY EMBODIMENTS

Figure 1C:
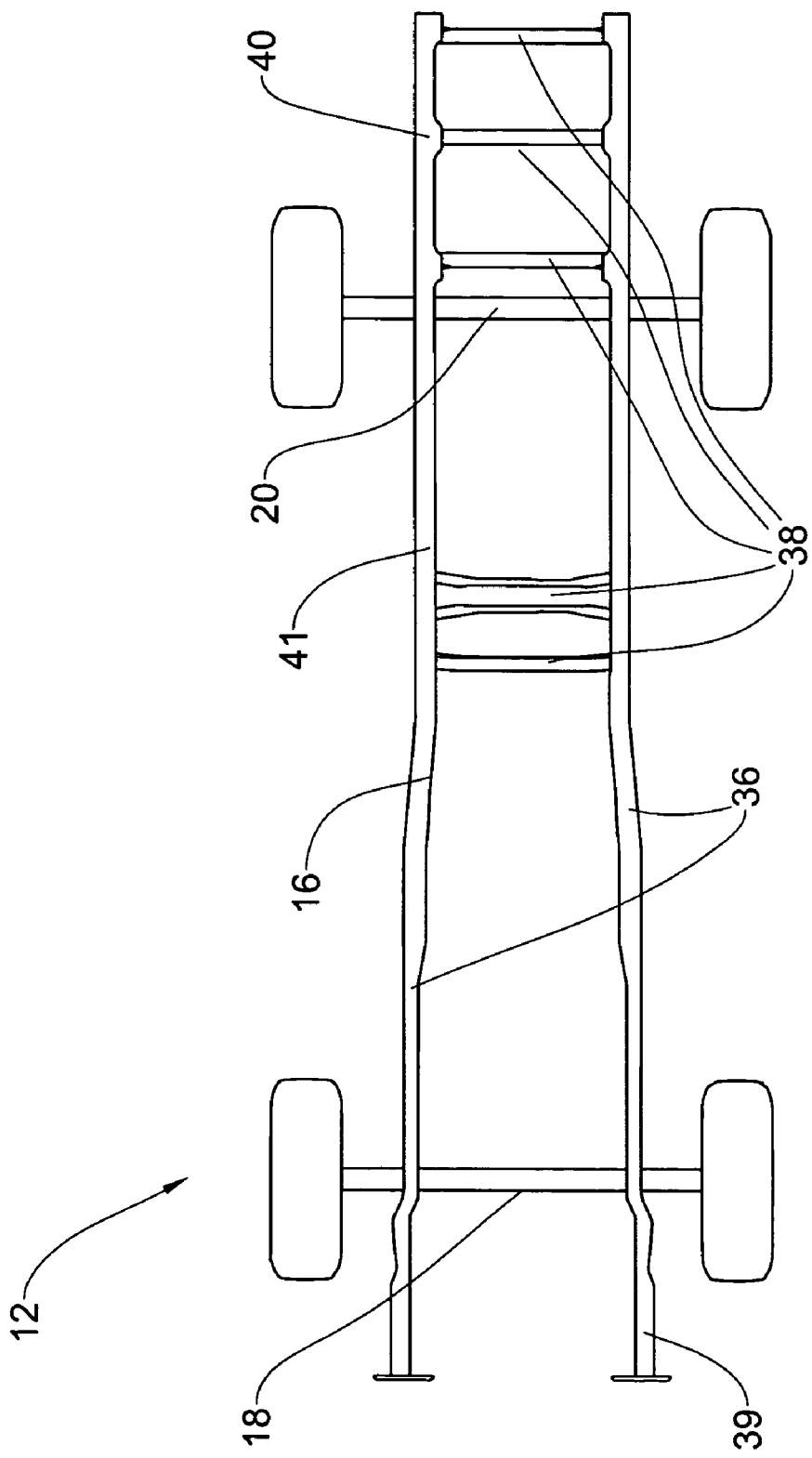
FIG. 1C is a top view of the chassis of the vehicle in FIGS. 1A and 1B.

With reference to FIG. 1A and 1B, there is shown an off-the-shelf 4×4 10 with a wheelbase of length L1, in this particular example, the Ford F350 with L1=(140"-141"). The vehicle 10 has a chassis 12 and a driver's cabin 14 mounted thereon. FIG. 1C shows a top view of the chassis 12 of the vehicle 10.

The chassis 12 comprises a frame 16, front axle 18, and a rear axle 20. The frame 16 comprises two strong side rails 36, and a number of cross-members 38. The frame has a front overhang 39 in front of the front axle 18, a rear overhang 40 behind the rear axle 20, and a middle part 41 between the axles.

On the chassis 12, there are mounted an engine 22, gearbox 24, transfer-case 26, front drive shaft 28, rear drive shaft 30, exhaust (muffler) 32, and fuel tank 34.

The cabin 14 comprises fenders 42, a hood 44, a windshield and frame 46, a roof 48, a floor 49, a rear wall 50, and two doors 52.

Figure 2A:
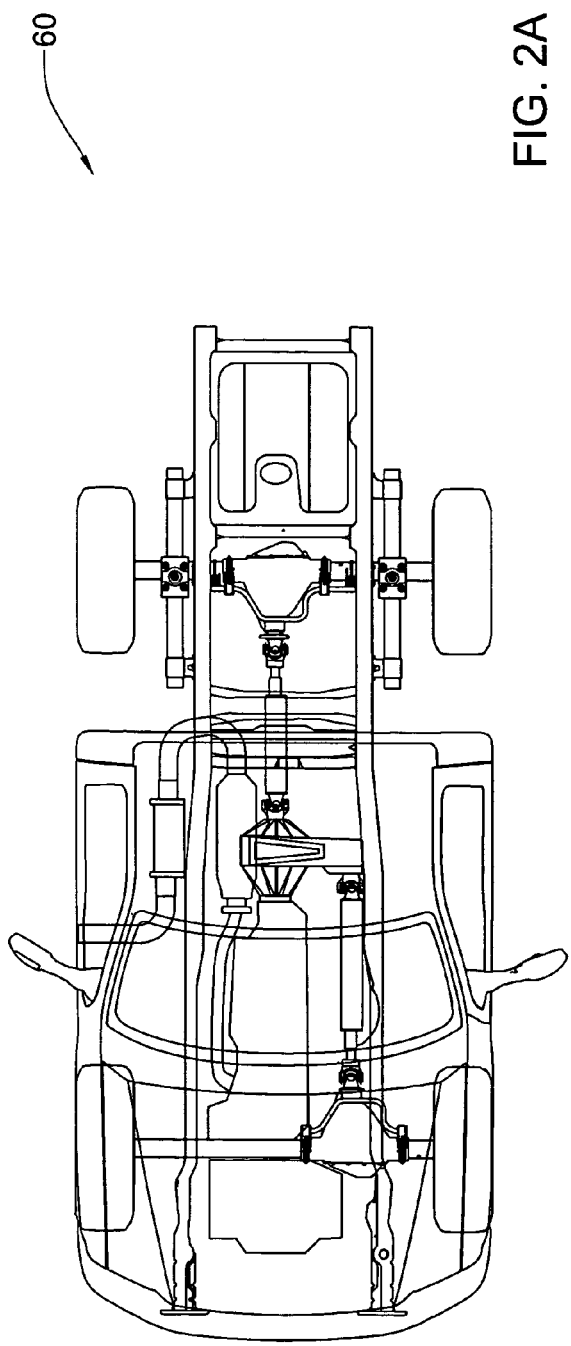
FIGS. 2A and 2B are respectively a top view and a side view of a 2-door vehicle, according to one embodiment of the present invention, converted from the vehicle in FIGS. 1A and 1B.
Figure 2B:
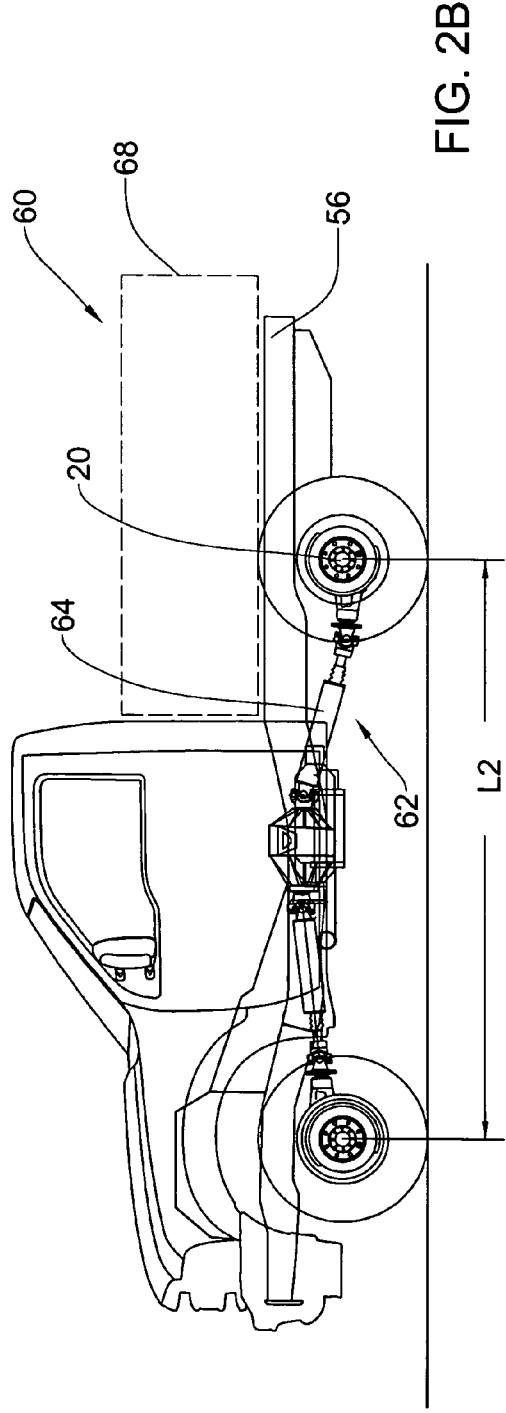

FIGS. 2A and 2B show a high mobility vehicle 60 converted from the vehicle 10 shown in FIGS. 1A, 1B and 1C. In FIGS. 2A and 2B, parts identical to those in FIGS. 1A, 1B and 1C are designated by the same reference numerals.

The process of "after-market" conversion of the vehicle 10 into the high mobility vehicle 60 included dismounting of the rear axle 20 and the rear drive shaft 30 (FIG. 1A) from the frame 16 (FIG. 1C), and shortening the frame 16 (FIG. 1C) by cutting a length from the middle part 41 (FIG. 1C) to obtain a shortened chassis 62. Then the rear axle 20 was mounted back to the shortened frame 56 with a new shorter rear drive shaft 64. The frame shortening may be also performed by cutting off the rear overhang 40 (FIG. 1C) of the frame 16 (FIG. 1C).

With the shortened chassis 62, shortened as described above, a shortened wheelbase is obtained with a length L2, in this example about 112", thereby providing dramatically improved maneuverability.

Figure 3:
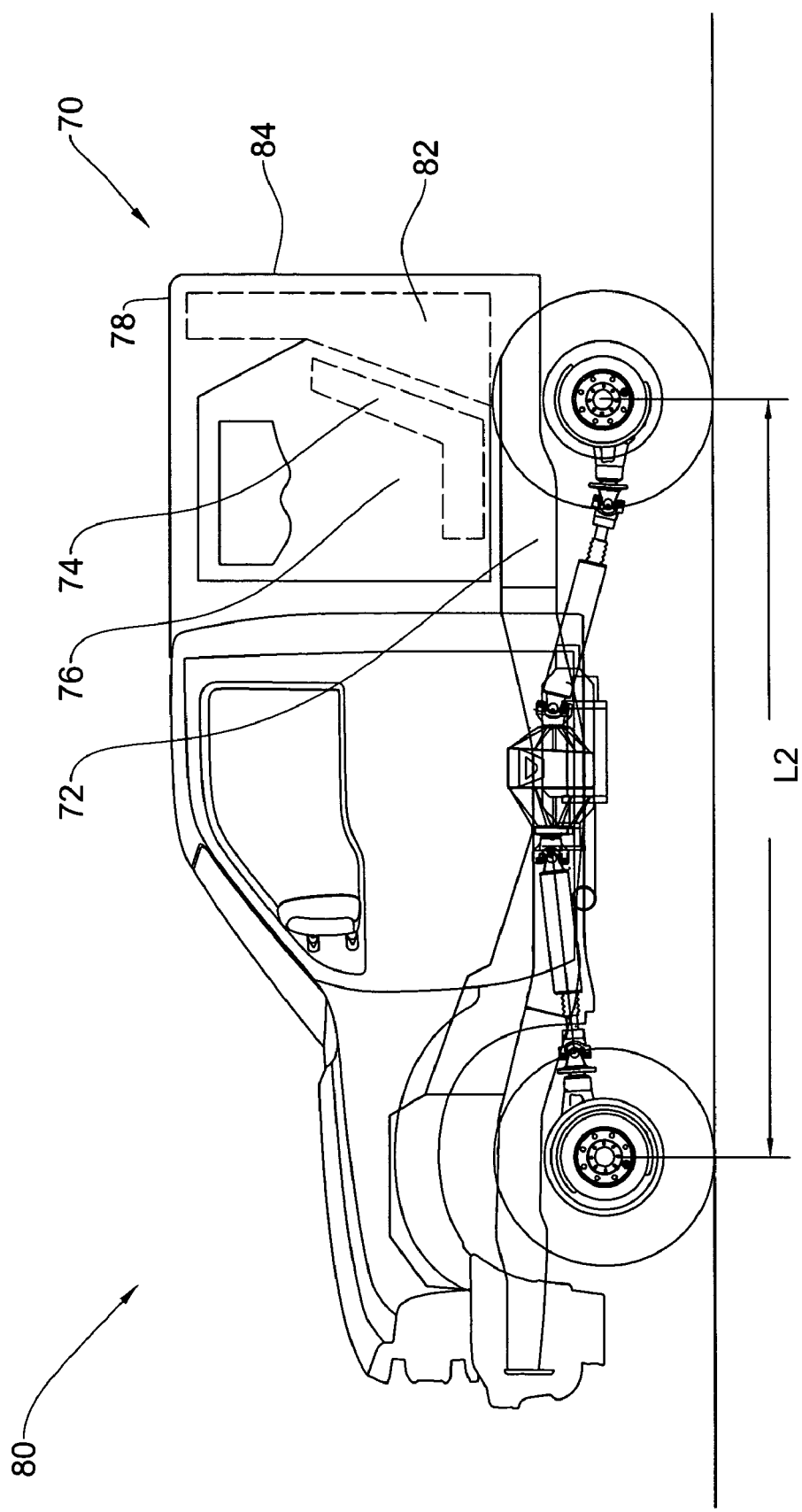
FIG. 3 is a side view of a 5-door vehicle, according to another embodiment of the present invention, converted from the vehicle of FIGS. 1A and 1B.

The high mobility vehicle 60 may be used as-is, with a shortened cargo bed 68. However, with reference to FIG. 3, it may be further converted to a high mobility extended-cabin vehicle 80, by cutting off the cabin's rear wall 50 (FIG. 1A), and extending the cabin by mounting of a rear part 70 including a floor 72, rear seats 74, two rear-side doors 76, and a roof extension 78. The high mobility extended-cabin vehicle 80 has a trunk 82 and a rear door 84. The rear seats 74, trunk 82, and the rear door 84 may be designed so as to allow insertion of a medical stretcher or other bulky equipment into the cabin, or emergency exit from the cabin.

Figure 4:
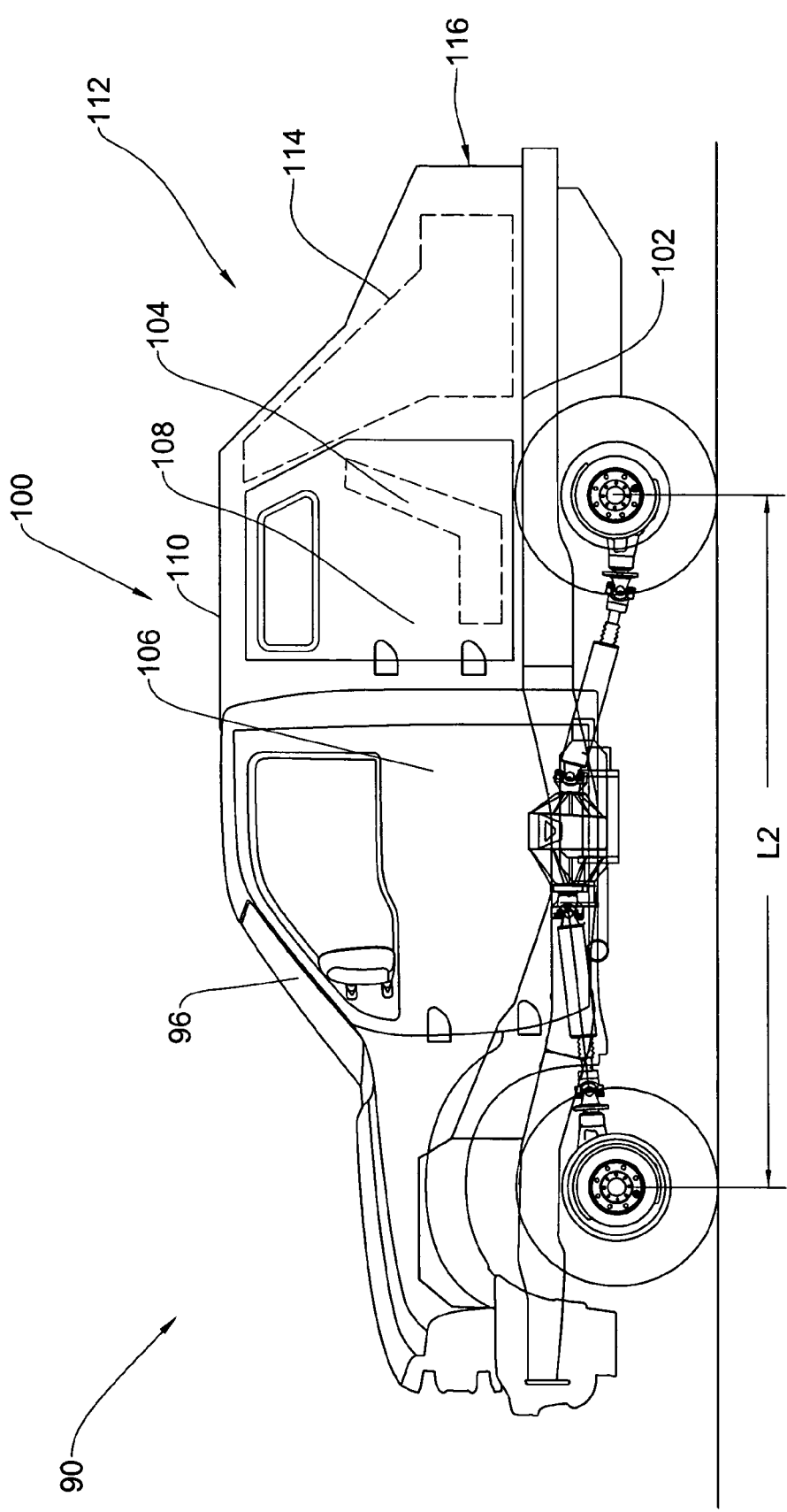
FIG. 4 is a side view of a 4-door armored vehicle, according to another embodiment of the present invention, converted from the vehicle in FIGS. 1A and 1B.

The method of the present invention may be modified and used for converting a vehicle 10 as shown in FIGS. 1A, 1B and 1C, into a high mobility armor-protected vehicle 90 as shown for example in FIG. 4. The conversion process comprises:

with reference to FIG. 1B, removing the windshield and frame 46, the roof 48, the floor 49, the two doors 52 and the rear wall 50;

mounting a new armored windshield and frame 96; and extending the cabin by mounting of a rear part 100 including a floor 102 and rear seats 104 thereon, front armored doors 106 and rear-side armored doors 108, armored roof 110, and armored rear body 112.

The high mobility armor-protected vehicle 90 may have a trunk 114 and a trunk lid 116 in the rear body 112. The rear seats 104, rear-side doors 108, trunk 114 and trunk lid 116 may be designed so as to allow insertion of a medical stretcher or other equipment into the cabin, or emergency exit from the cabin.

Figure 5:
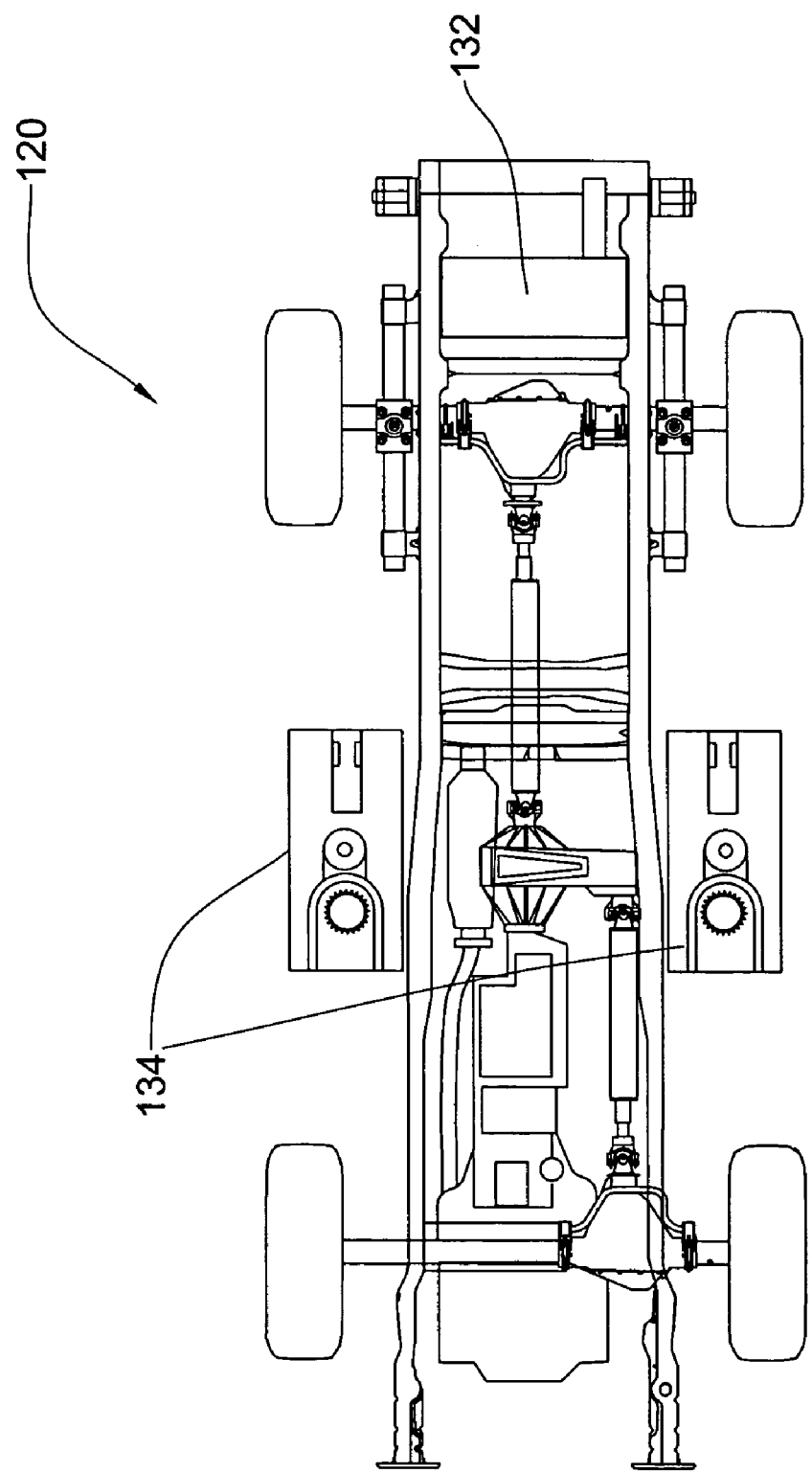
FIG. 5 is a top view of the chassis of the armored vehicle in FIG. 4.

FIG. 5 shows further modifications in a shortened chassis 120, converted from a vehicle 10 as shown in FIGS. 1A, 1B and 1C, that may be performed if the rear overhang 40 (FIG. 1B) is shortened in comparison with the original length. The fuel tank 34 (FIG. 1A) is removed, the exhaust (muffler) 132 is re-routed to the rear and new fuel tanks 134 are located under the cabin.

The off-the-shelf pick-up Ford F350 is designed for GVW 4.5 ton, while the armored vehicle may be built for 4 ton GVW to obtain a technical safety factor for the chassis and different components. The armor of the converted vehicle may include for example:

transparent armor—multilayer glass with thickness 30-45 mm;

steel sheet in the doors, 4.5-5 mm thick;

steel sheet in the windshield frame and the doors, 6-6.5 mm thick;

steel sheet for the floor 3-4 mm thick.

The vehicle converted by the method of the present invention may be also protected by add-on armor. Alternatively, the driver's cabin may be entirely removed and replaced by an armored body on the shortened chassis.

A converted armored vehicle may be obtained also from an off-the-shelf pick-up Ford F37 designed for a GVW of 5.7 tons, while the armored vehicle may be designed for a GVW of 5 tons. In this case, the floor may be armored and the armored windows may be 60 mm thick or more.

It will be appreciated that the method of the present invention may be used with other off-the-shelf vehicles, for example trucks with double tires, etc.

The invention claimed is:

1. A method for after market conversion of a 4×4 produced by a manufacturer, having a chassis with a frame, front axle and rear axle, said chassis having a standard wheelbase, into a high mobility vehicle having increased maneuverability and on-road and/or off-road capability, relative to the 4×4, the method comprising:
   dismounting at least one of the front axle or rear axle from said frame;
   shortening said frame;
   mounting the dismounted axle to the shortened frame so as to obtain a shortened chassis having a shortened wheelbase which is shorter than any standard wheelbase of the line of models produced by said manufacturer; and
   protecting at least a portion of said high mobility vehicle by armor.

2. The method of claim 1, wherein the shortening of said frame is performed by one of the following: cutting off the rear overhang of the frame, cutting off the front overhang of the frame, or cutting off a middle part of the frame and restoring the frame integrity.

3. The method of claim 1, wherein said standard wheelbase is about 140" or more and said shortened wheelbase is about 112" or less.

4. The method of claim 1, wherein said 4×4 has a driver's cabin comprising at least two doors and a rear wall, said method further comprising:
   cutting off the cabin's rear wall; and
   extending the cabin by mounting of a rear part including floor, side and roof extensions and a rear wall, with optional seats, side doors, rear door, trunk and trunk lid.

5. The method of claim 1, wherein said 4×4 has a first GVW and the converted high mobility vehicle including said armor has a second GVW not exceeding said first GVW.

6. The method of claim 1, wherein said 4×4 has a driver's cabin, the method further comprising:
   removing the driver's cabin; and
   building an armored vehicle body on the shortened frame.

7. A high mobility vehicle converted from a 4×4 by the method of claim 1.

8. The high mobility vehicle of claim 7, wherein said standard wheelbase is about 140" or more and said shortened wheelbase is about 112" or less.

9. The high mobility vehicle of claim 7, wherein said 4×4 has a driver's cabin comprising a rear wall, said vehicle having a body obtained from the driver's cabin by cutting off the rear wall and extending the driver's cabin by mounting of a rear part including floor, side and roof extensions and a rear wall, with optional seats, side doors, rear door, trunk and trunk lid.

10. The high mobility vehicle of claim 9, wherein said seats, side doors, rear door, trunk and trunk lid are designed so as to allow insertion of a medical stretcher or other equipment into said cabin or emergency exit from the cabin.

11. The high mobility vehicle of claim 7, wherein said vehicle is protected by armor.

12. The high mobility vehicle of claim 11, wherein the 4×4 has a first GVW and the high mobility vehicle including said armor has a second GVW not exceeding said first GVW.

13. The high mobility vehicle of claim 7, wherein said 4×4 has a driver's cabin, the driver's cabin having been removed and an armored vehicle body built on the shortened frame.

14. The high mobility vehicle of claim 13, wherein said vehicle body includes a floor with front and rear seats thereon, and is mounted on the shortened frame, the body further having armored fenders, armored hood, armored windshield and windshield frame; four armored doors, an armored roof and an armored rear body portion with optional armored rear door or armored trunk and armored trunk lid.

15. The high mobility vehicle of claim 14, wherein said armored rear body portion, rear seats, armored rear door or armored trunk and armored trunk lid are designed so as to allow insertion of a medical stretcher in said vehicle body or emergency exit from the cabin.

16. A high mobility vehicle converted from a 4×4 produced by a manufacturer, said 4×4 having a chassis with a frame, front axle and rear axle, said chassis having a standard wheelbase, said high mobility vehicle having increased maneuverability and on-road and/or off-road capability, relative to the 4×4 and comprising:
   a chassis with a wheelbase shorter than any standard wheelbase of the line of models produced by said; and
   armor protecting at least a portion of said high mobility vehicle.

17. The high mobility vehicle of claim 16, wherein said vehicle is protected by armor.

18. The high mobility vehicle of claim 17, wherein the 4×4 has a first GVW and the high mobility vehicle including said armor has a second GVW not exceeding said first GVW.

19. An armored high mobility vehicle converted from a 4×4 produced by a manufacturer, said 4×4 having a chassis with a frame, front axle and rear axle, said chassis having a standard wheelbase, said high mobility vehicle having increased maneuverability and on-road and/or off-road capability, relative to the 4×4 and comprising:
   a chassis with a wheelbase shorter than any standard wheelbase of the line of models with a similar GVW produced by said manufacturer; and
   a GVW, including said armor, lower than the GVW of said 4×4.

* * * * *

UNITED STATES PATENT AND TRADEMARK OFFICE
CERTIFICATE OF CORRECTION

PATENT NO.        : 7,726,675 B2
APPLICATION NO.   : 11/524946
DATED             : June 1, 2010
INVENTOR(S)       : Yakov Ben-Ari and Tal Dai It is certified that error appears in the above-identified patent and that said Letters Patent is hereby corrected as shown below:

Column 6, Claim 16, Line 32:
Please delete "produced by said; and" and replace with -- produced by said manufacturer; and --

Signed and Sealed this

Seventh Day of September, 2010

David J. Kappos
*Director of the United States Patent and Trademark Office*